United States Patent [19]

Foster et al.

[11] 4,076,792

[45] Feb. 28, 1978

[54] CATALYST SYSTEMS FOR THE REDUCTION OF THE OXIDES OF NITROGEN

[75] Inventors: Gordon F. Foster, Campbell; Helmuth E. Meissner; Janice L. Stiles, both of Painted Post, all of N.Y.

[73] Assignee: Corning Glass Works, Corning, N.Y.

[21] Appl. No.: 243,255

[22] Filed: Apr. 12, 1972

[51] Int. Cl.$^2$ .............................................. B01D 53/00
[52] U.S. Cl. ........................... 423/213.5; 252/466 PT
[58] Field of Search ....................... 423/213, 214, 239; 252/466 PT

[56] References Cited

U.S. PATENT DOCUMENTS

| 2,601,221 | 6/1952 | Rosenblatt et al. .................. 423/351 |
| 3,118,727 | 1/1964 | Cohn et al. ........................... 423/239 |
| 3,397,034 | 8/1968 | Tulleners et al. .................... 423/214 |
| 3,433,581 | 3/1969 | Stephens et al. ..................... 423/213 |
| 3,554,929 | 1/1971 | Aarons ................................ 423/213.5 |
| 3,565,830 | 2/1971 | Keith et al. ....................... 423/213 X |
| 3,637,344 | 1/1971 | Thompson ........................... 423/213 |
| 3,784,675 | 1/1974 | Kobylinski et al. ............. 423/213.5 |

FOREIGN PATENT DOCUMENTS

| 623,256 | 7/1961 | Canada .................................. 423/239 |
| 662,460 | 12/1951 | United Kingdom. |

*Primary Examiner*—G. O. Peters
*Attorney, Agent, or Firm*—Kees van der Sterre; Clinton S. Janes, Jr.; Clarence R. Patty, Jr.

[57] ABSTRACT

Devices and processes are disclosed for the treatment of waste gases, particularly automotive exhaust gases, to remove the oxides of nitrogen therefrom. Mixed noble metal catalysts consisting essentially of platinum or palladium and at least one other noble metal selected from the group consisting of ruthenium, rhodium, and iridium are employed in combination with layered oxide support coatings to eliminate ammonia formation during the removal process.

3 Claims, 2 Drawing Figures

CATALYST SYSTEMS FOR THE REDUCTION OF THE OXIDES OF NITROGEN

BACKGROUND OF THE INVENTION

The use of the noble metals platinum, palladium, iridium, and ruthenium to oxidize harmful combustible constituents such as carbon monoxide and hydrogen present in automobile exhaust gases is well known. For example, U.S. Pat. No. 2,742,437 discloses a catalytic structure suitable for use in automotive exhaust systems to oxidize harmful exhaust constituents comprising an impervious support structure having an intermediate metal oxide support coating and a catalytic coating of platinum, ruthenium, iridium, or palladium. The noble metal catalytic coating is effective to oxidize at least a part of the combustible constituents present in the exhaust gases passing through the passages in the structure to carbon dioxide and water.

It is also known to use noble metals to reduce the oxides of nitrogen present in industrial waste gases. U.S. Pat. No. 3,032,387, for example, describes the use of platinum, ruthenium, and palladium as catalysts to promote a reaction between $NO_2$ and a fuel gas to produce NO and a further reaction between NO and $NH_3$ to produce nitrogen and water.

Oxides of nitrogen in automobile exhaust gases present a special problem because substantially complete elimination must be accomplished without the introduction into the atmosphere of harmful reduction by-products and, preferably, without the need for the use of fuel gases or ammonia to aid in the neutralization process. Thus, while the use of pure noble metals to catalytically promote the reduction of the oxides of nitrogen is known, most prior art processes either require the use of ammonia and fuel gases to aid in the reduction process or produce harmful gases such as ammonia as by-products of the catalytic reduction.

The removal of nitrogen oxide pollutants from automobile exhaust gases should preferably be accomplished with a small self-contained unit requiring no inputs of neutralizing gases and producing no harmful reaction by-products. Physical and thermal stability are further requirements of such a unit. Repeated physical shock, thermal cycling and sustained operation at temperatures perhaps as high as 1600° F. may be encountered. Thus, the catalyst system employed must be able to retain a useful degree of catalytic activity over a broad range of temperatures for extended periods of service, and the components supporting the catalyst must not be degraded by high temperatures or thermal shock.

It is one object of the present invention to provide a process for catalytically treating automotive exhaust gases to remove the nitrogen oxides present therein without the addition of neutralizing fuels or gases and without producing objectionable quantities of reaction by-products such as ammonia.

It is a further object of the present invention to provide supported mixed noble metal catalyst systems which are useful in the process of catalytically treating exhaust gases according to the present invention.

It is another object of the present invention to provide supported mixed noble metal catalyst systems which simultaneously promote not only the reduction of nitrogen oxides in exhaust gases, but also simultaneously promote the oxidation of carbon monoxide and unburned hydrocarbon constituents present therein.

Other objects and advantages of the invention will become apparent from the following description and examples thereof.

SUMMARY OF THE INVENTION

Briefly, we have discovered noble metal catalyst systems which are capable of efficiently converting the NO and $NO_2$ present in automotive exhaust gases to $N_2$ and non-hazardous $N_2O$ without the formation of ammonia by-products. These catalyst systems are also effective for the oxidation of carbon monoxide and hydrocarbons, and would, therefore, provide assistance to a companion oxidative converter in an automotive emissions control system, particularly during cold engine operation when CO and hydrocarbon emissions are heavy and nitrogen oxide emissions not significant.

The catalyst systems of the invention employ mixed noble metal catalysts consisting essentially, in weight percent, of at least one noble metal catalyst selected in the indicated proportion from the group consisting of 30–70% ruthenium, 10–70% iridium, and 10–70% rhodium, the total weight of these catalysts not exceeding about 70% by weight of the mixture. The remainder of the mixture may be composed of platinum, palladium, or mixtures thereof.

The above mixed noble metal catalysts are typically used in combination with refractory support structures coated with layered high-surface-area support coatings composed of metal oxides such as silica, alumina, titania, zirconia, magnesia, tin oxide, manganese oxide and the like. The support structures have a configuration which is effective to maximize contact between the catalyst-bearing surfaces thereof and the waste gases to be treated while the support coatings protect the catalyst from poisoning and thermal degradation. Layered coatings comprising a base layer of alumina, silica, or mixtures thereof and a surface layer of differing composition composed of an oxide selected from the group consisting of titania, silica, zirconia, manganese oxide and tin oxide are particularly suitable for use as supports. However, single layer oxide coatings composed of alumina, titania, silica, manganese oxide, tin oxide, or mixtures thereof are also operative.

The process of the present invention includes a process for treating waste gases of hydrocarbon combustion processes to reduce the presence of the oxides of nitrogen therein comprising contacting the gases with the described mixed noble metal catalysts, preferably supported on the disclosed layered support coatings, while maintaining a temperature in the contact region at least sufficient to initiate the catalytic reduction of nitrogen oxides. The described process is advantageous in that it permits the reduction of $NO_2$ and NO in automotive exhaust gases to nitrogen, or at least to harmless $N_2O$, without the production of objectionable quantities of ammonia as by-product and without the use of fuel gases or the like to promote the desired reduction. The capability of removing nitrogen oxides without the formation of ammonia is quite important in automotive exhaust emissions control systems, and we have found that both catalyst composition and the nature of the catalyst support have significant effects on ammonia formation in the automotive exhaust environment. Thus, while the mixed noble metal catalysts disclosed herein demonstrate a surprising capability to suppress ammonia formation even in combination with catalyst supports known in the prior art, the support systems we employ are effective to further control ammonia formation, and in many cases provide the added margin of activity and selectivity necessary to enable a motor vehicle to pass government emissions standards.

DESCRIPTION OF THE DRAWINGS

The invention may be further understood by reference to the appended DRAWINGS, wherein.

DESCRIPTION OF THE PREFERRED EMBODIMENTS

Figure 1:
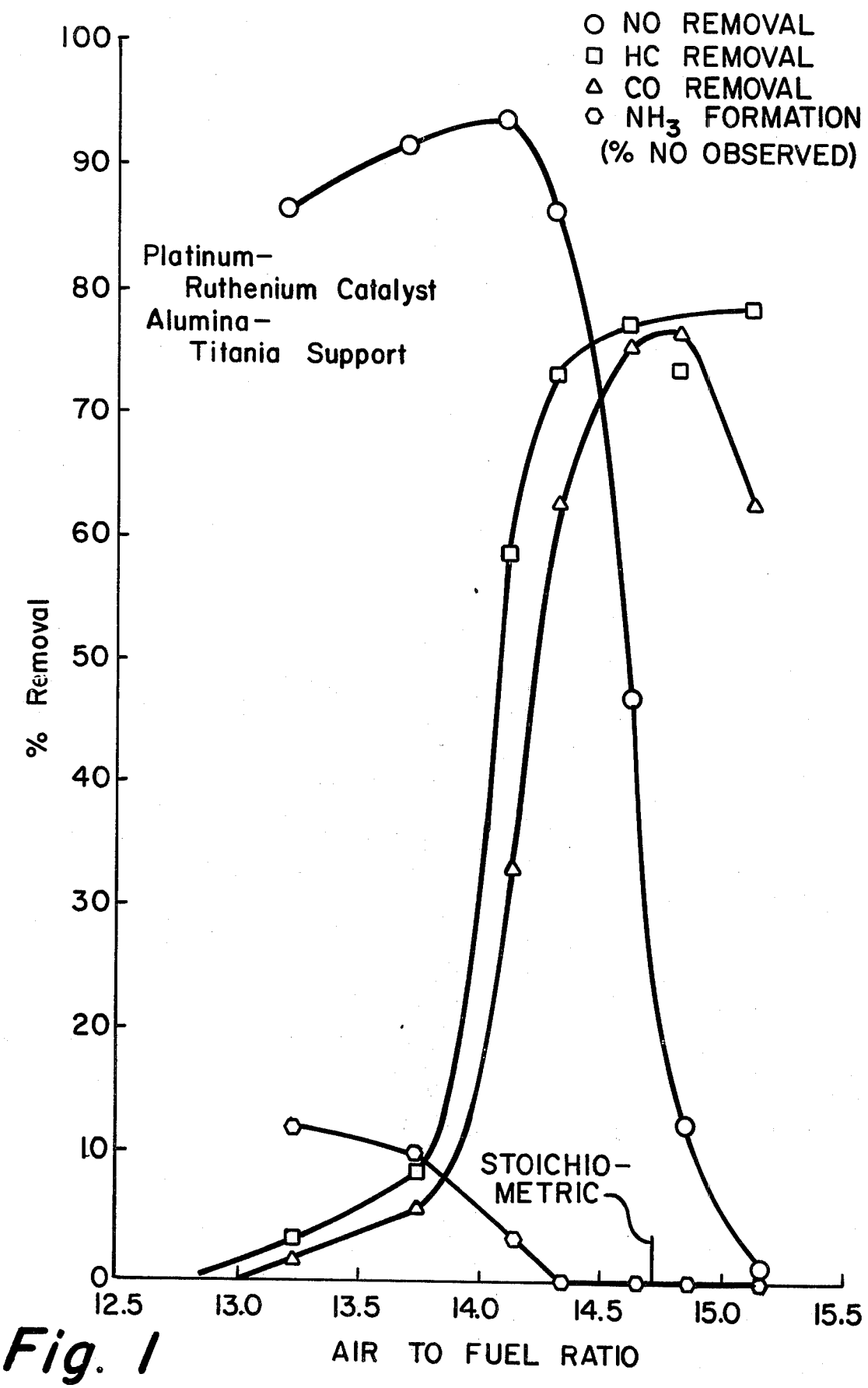
FIG. 1 shows the efficiency which is obtainable using the devices and process of the present invention to remove carbon monoxide, unburned hydrocarbons and nitric oxide present in the exhaust gases of an internal combustion automobile engine. The amount of ammonia formed is also indicated. Both percent removal for each polllutant and ammonia formation are shown as functions of the air-to-fuel ratio maintained in the fuel mixture supplied to the engine.

In carrying out the processes of the present invention, we prefer to employ monolithic refractory support structures of the honeycomb-type, such as are described, for example, in the patent to Hollenbach, U.S. Pat. No. 3,112,184. These structures have high surface area-to-weight ratios which are desirable in maximizing catalytic efficiency, and they are convenient to handle. Examples of suitable structures are ceramic or glass-ceramic monoliths composed principally of refractory compounds selected from the group consisting of silica, alumina, magnesia, titania, zirconia, cordierite, petalite and spodumene. Of course, other refractory support structures known in the art, including, for example, alumina beads or refractory glass supports may alternatively be employed.

It is desirable in carrying out the process of the present invention, to provide a catalyst support coating between the support structure and the catalyst to protect the catalyst both from poisioning due to the influence of the support structure and degradation at elevated temperatures. In addition, our coatings are effective to surpress ammonia formation during the reduction of the oxides of nitrogen to nitrogen or harmless $N_2O$, and they appear to enhance and preserve the activity of our mixed noble metal catalysts. Layered support coatings comprising a base layer composed of alumina, silica or mixtures thereof and a covering layer of an oxide selected from the group consisting of silica, titania, zirconia, tin oxide and manganese oxide are particularly suitable. The layers typically have thicknesses in the range from about 1-5 mils, although thickness is not critical to their effectiveness as supports. Such layered support coatings and methods of preparing them are completely described and claimed in the copending application of G. F. Foster and H. E. Meissner, Ser. No. 243,417, entitled "Support Coatings for Catalysts", concurrently filed herewith and assigned to the assignee of the present invention, and the disclosure of that application is expressly incorporated herein by reference.

Layered oxide catalyst support coatings to be used in the process of the present invention may be applied by any of the methods known in the prior art, but are preferably applied by the methods disclosed in the aforementioned copending commonly-assigned application. Briefly, those methods comprise the impregnation of the selected support structure with the lower alkoxides of metals selected for incorporation in the oxide support coating, followed by the in situ hydrolysis of the metal alkoxides present on the support structure to form an adherent coating of hydrous metal oxides. The coated support structure may then be fired to convert the hydrous metal oxides to an oxide support coating of very high surface area and good porosity. Layered support coatings prepared according to this procedure are particularly desirable because they are particularly effective in enhancing and stabilizing the activity of noble metal catalysts.

Following the deposition of a suitable oxide support coating, our mixed noble metal catalysts may be applied to the coating using any of the well-known deposition methods for noble metal catalysts. Suitable methods of deposition include, for example, impregnation of the support coating with aqueous solutions of simple or complexed noble metal ions. In the case of platinum, commonly used acidic solutions of complexed ions include, for example, aqueous solutions of $H_2PtCl_6.xH_2O$; commonly used alkaline solutions include, for example, alkaline ammine solutions of $Pt(NH_3)_6^{+4}$. Following impregnation, the catalyst metals are deposited on the support coating as a uniform dispersion of very small particles by firing to remove volatile species, or by reduction in situ to the metallic state with reducing agents such as $NaBH_4$, hydrazine or hydrazine salts, organic reducing agents such as formic or citric acid or formaldehyde, or reducing gas mixtures.

While the amount of catalyst deposited on the support coating is not critical in obtaining good activity in our system, we have found that control over catalyst loading is an effective means of minimizing ammonia formation. We typically employ catalyst loadings in the range from about 0.1–0.5% by weight of the completed device in the case of monolithic honeycomb support structures of the preferred type. However, we have found, for example, that catalysts loadings of about 0.2–0.5% by weight of the device are effective to minimize ammonia formation in systems employing our platinum-ruthenium binary mixtures, whereas loadings of about 0.1–0.2% by weight are preferred for this purpose in systems employing our platinum-rhodium or platinum-iridium binary mixtures. The determination of these optimum catalyst loadings within our supported catalyst systems is a routine matter, well within the ordinary skill of the art.

The following example more specifically illustrates a procedure which may be followed in preparing a catalytic device which is particularly preferred in carrying out the process of the present invention:

EXAMPLE I

A monolithic cordierite ceramic honeycomb structure of cylindrical shape with about 4-⅜ inch diameter and 3 inch height, consisting of about 200 cells per square inch of cross sectional area and weighing about 456.8 grams, was coated with high-surface-area alumina by repeated immersion into a melt of aluminum isopropoxide at a temperature of 100°–120° C. The excess of the liquid alkoxide was removed mechanically. Then the aluminum alkoxide was converted into hydrated alumina by hydrolysis in a steam atmosphere at 120° C. and a corresponding pressure of about 18 psi for 30 minutes. After repeating this coating procedure once, the sample was fired at 600° C. for 24 hours. A weight increase of 24.1 grams was observed due to the thus-prepared alumina coating.

Two successive layers of hydrous titania were then applied to the sample by repeated immersion into titanium tetraisopropoxide at room temperature for a duration of about 1 to 2 minutes and hydrolyzing the alkoxide as in the case of the aluminum triisopropoxide above. The hydrous titania layer (of approximate composition $TiO_2.H_2O$) increased the sample weight by 29.6 grams.

A catalyst solution was prepared by dissolving 3.7 grams $H_2PtCl_6.xH_2O$ (about 37.5% Pt) and 3.3 grams $RuCl_3.H_2O$ in 650 c.c. of distilled water. The sample was inserted into this solution in a tight fitting container such that the top surface of the sample was just covered. Water was removed subsequently by drying at 40° C. in a vacuum so that the noble metal chlorides were deposited evenly on the coated support structure. After drying the sample at 120° C. for 2 hours, it was transferred to a tube furnace, heated to 500° C. at the furnace rate, and maintained at 500° C. for 2 hours in a flowing gas atmosphere consisting of 90% nitrogen and 10% hydrogen by volume. Then the gas stream was interrupted and the furnace was allowed to cool. The catalyst applied by this procedure consisted of a mixture of 2.8 grams of platinum and 2.8 grams of ruthenium.

The efficiency of this catalytic device was tested for automotive applications by installing it on one side of a dual exhaust system to treat one-half of the exhaust of a 351-CID automobile engine. During the test, the engine was operating at 1500 r.p.m. and measurements were taken under steady-state conditions while maintaining an exhaust gas space velocity through the device of about 200,000 hr.$^{-1}$. The temperature of the exhaust gases was maintained at 1000° F. at the inlet to the device. To measure the efficiency of conversion, the percent removal of carbon monoxide, hydrocarbon and nitrogen oxides from the exhaust gas stream was continuously monitored during engine operation while the air-to-fuel ratio was varied from about 13 to 1 to about 15 to 1. The amount of ammonia formed as a by-product of the nitrogen reduction process was also measured continuously.

The results of this testing procedure are set forth in FIG. 1 of the DRAWING which shows the percent removal of each of the three pollutants NO, CO and HC (hydrocarbons) as a function of the air-to-fuel ratio of the fuel mixture supplied to the engine. Also shown is a plot of percent NO observed as the result of ammonia formation. Ammonia formation is conventionally measured by oxidizing any ammonia by-product to NO and then calculating the amount of NO observed to result from this oxidation. A study of the drawing indicates that our catalytic device is capable of removing up to about 95% of the NO present in an exhaust gas where the air-to-fuel ratio is maintained at about 14-to-1. Maintaining the air-to-fuel ratio at about 14.5-to-1, on the other hand, would permit the simultaneous removal of large amounts of NO, CO and hydrocarbons while producing essentially no ammonia by-products.

Figure 2:
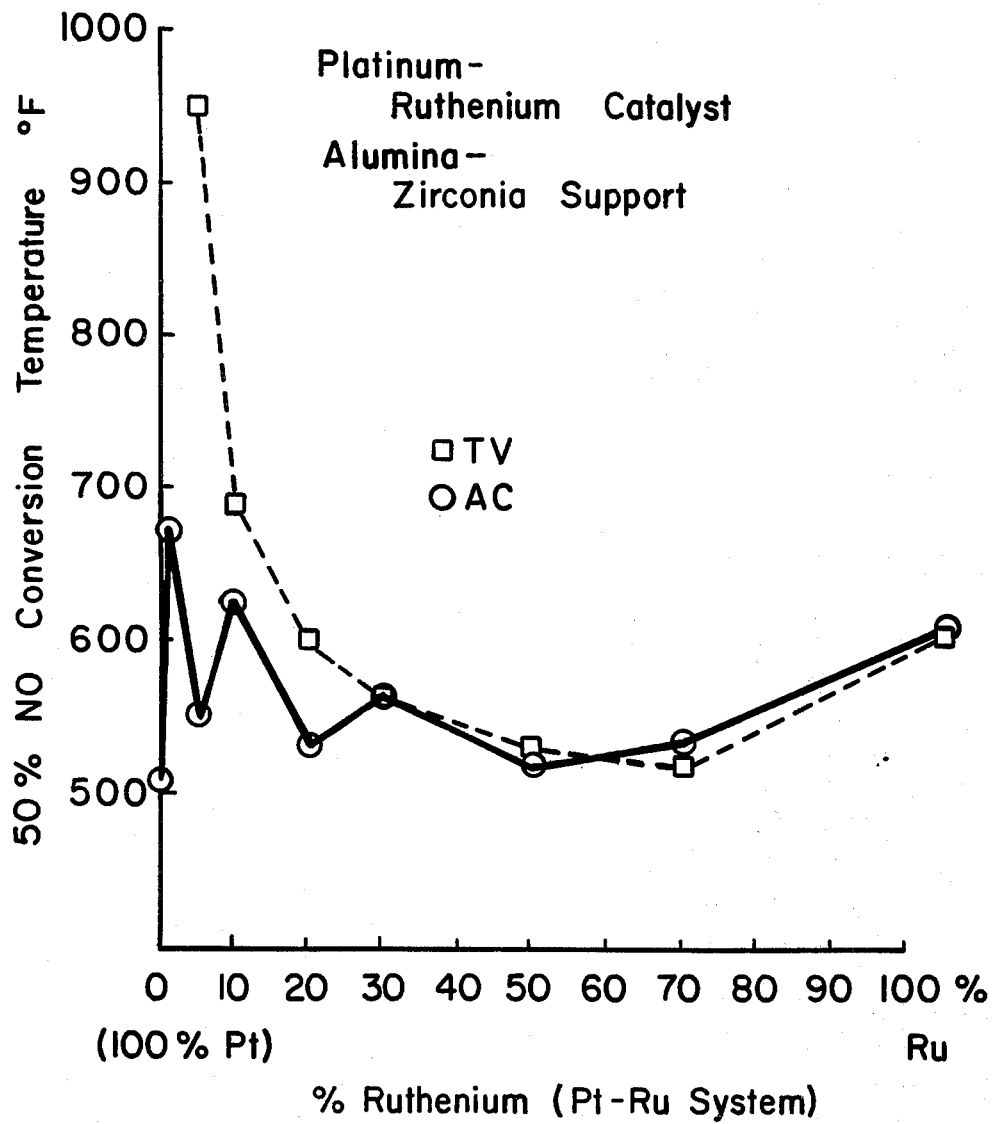
FIG. 2 compares the efficiency of nine different noble metal catalysts in the platinum-ruthenium binary system. The comparison is made in terms of the operating temperatures required for conversion of 50% of the nitric oxides present in a test gas stream to $N_2$ or $N_2O$. The solid line in FIG. 2 connects the observed 50% removal temperatures (TV) of the nine devices, and reflects the superior activity of the mixed noble metal catalysts in terms of the lower temperatures required for 50% removal of NO. The broken line connects the redetermined 50% conversion temperatures (AC) of the same devices for a supplemental test in which the ammonia by-products of the NO reduction process are reoxidized and emitted as NO with the rest of the treated gases. This emission raises the observed 50% conversion temperatures of the devices in cases where significant amounts of ammonia are formed. From this line, it is apparent that platinum and platinum-rich catalysts produce substantial quantities of ammonia under the test conditions employed, whereas ruthenium and platinum-ruthenium mixtures containing at least about 30% ruthenium show greatly reduced ammonia formation.

In obtaining favorable conversion results such as are described above, it is essential that the composition of the mixed noble metal catalysts employed be maintained within the composition limits hereinabove set forth. An example of the importance of composition on the capability of such catalytic devices to remove NO efficiently from the exhaust stream without producing objectionable amounts of ammonia is shown in FIG. 2 of the drawing. FIG. 2 directly compares the conversion efficiencies of nine different catalytic conversion units employing nine different platinum, ruthenium and mixed platinum-ruthenium catalysts. Those units comprised cordierite ceramic honeycomb support structures coated with layered alumina-zirconia support coatings upon which the catalysts were dispersed. The catalyst loading in each case was 0.1% by weight of the device. All of the devices were prepared generally as described in Example I, except that zirconium n-propoxide rather than titanium isopropoxide was used in the preparation of the surface layer of the support coating.

The comparison of efficiency in FIG. 2 is made in terms of the capability of each device to remove 50% of the available NO from a test gas stream consisting of 1000 p.p.m. NO, 250 p.p.m. propylene, 1% CO, 10% $H_2O$ vapor, 0.5% $O_2$ and the remainder nitrogen by volume, passing through the device at a space velocity of about 15,000 hr.$^{-1}$. A device with a high degree of catalytic activity is generally capable of 50% efficiency at comparatively low temperatures, whereas a device of lesser activity requires higher operating temperatures to achieve the same efficiency. The solid line in FIG. 2 connects the 50% NO conversion temperatures (designated TV) for each of the nine devices tested, and clearly indicates the superior activity of mixed platinum-ruthenium catalysts, as compared with either pure platinum or pure ruthenium catalysts, for the removal of NO.

The broken line in FIG. 2 connects the 50% conversion temperatures (designated AC) of the same devices measured for an altered test-bed condition in which the ammonia by-products of the catalytic nitrogen reduction process are oxidized back to NO and measured in the exiting gas stream as unconverted NO. Thus, under this condition, any ammonia by-products of the reaction are emitted as NO and have the effect of decreasing the apparent efficiency of the device by raising the 50% conversion temperature. The amount of ammonia formed is roughly proportional to the increase in the 50% conversion temperature observed when the test bed is altered to reoxidize and emit the $NH_3$ as NO. Although the conversion temperatures in FIG. 2 are considered accurate only to within about ±15° F., it is quite apparent that increasing amounts of $NH_3$ by-products are formed as the platinum content of the catalysts increases beyond about 70% by weight. On the other hand, essentially no ammonia is is formed as a reaction by-product with mixed platinum-ruthenium ruthenium catalysts containing at least about 30% ruthenium, or with pure ruthenium catalysts.

Not withstanding the fact that pure ruthenium produces only minor amounts of ammonia as a by-product of the reduction of NO under the conditions described, ruthenium is not considered suitable for use alone in the method of the present invention. As we have previously shown, ruthenium is not as active for the conversion of NO to $N_2O$ or $N_2$ as are the mixed platinum-ruthenium noble metal catalysts herein disclosed. Further, ruthenium is not as active for the oxidation of carbon monoxide and hydrocarbons as would be desirable in case where the NO converter is required to assist the oxidative converter in the earlier stages of motor vehicle operation. It is presently planned to employ the NO (or so-called $NO_x$) catalytic conversion unit as an oxidative converter during cold engine operation, since nitric oxide is not formed in appreciable quantities until after the combustion chamber has reached normal operating temperatures. To enable the unit to operate in this fashion, excess air will be added to the exhaust gas in front of the converter to increase its efficiency as an oxidative unit. After vehicle warm-up, the $NO_x$ converter unit will be shifted to the reducing mode by discontinuing the addition of excess air.

Mixed noble metal catalysts have an additional significant advantage over most pure noble metal catalysts where dual mode $NO_x$ converters are required, as may be shown by the behavior of platinum-ruthenium catalysts in dual mode systems. During operation in the oxidation mode, degradation in catalytic activity toward the reduction of NO of both mixed platinum-ruthenium and pure ruthenium catalysts is observed. As a result, we have found that a "break-in" period of operation in the reducing mode is required following a period of operation in the oxidation mode before original NO conversion efficiency is re-established. It is possible that this behavior is attributable to the oxidation of ruthenium to less active ruthenium oxide during operation in the oxidation mode. In any event, mixed platinum-ruthenium catalysts apparently require a much shorter "break-in" period than do pure ruthenium catalysts upon return to the reducing mode of operation, and this would provide a significant advantage in a dual mode converter system. All of the other mixed noble metal catalysts of our invention also provide this advantage to some degree.

Although all of the disclosed platinum-ruthenium mixed catalysts will provide one or more of the advantages discussed above, we prefer to employ platinum-ruthenium mixtures consisting essentially, in weight percent, of 50–70% ruthenium and 30–50% platinum in treating exhaust gases according to the method of the present invention. These compositions appear to provide the best combination of pollution control properties. Further, although useful support coatings may be selected from the group consisting of alumina coatings and layered coatings having a base layer composed of alumina, silica and mixtures thereof and a surface layer composed of an oxide selected from the group consisting of silica, titania, zirconia, tin oxide, and manganese oxide, we prefer to employ layered coatings having a base layer of alumina and a surface layer of silica, zirconia or tin oxide.

Example II below describes in detail the preparation of a platinum-ruthenium catalyst on the alumina-$SnO_2$ support coating according to the present invention:

EXAMPLE II

A cordierite ceramic monolithic substrate of cylindrical shape (1 inch diameter and 2 5/16 inch height) with about 230 parallel channels per square inch of cross sectional area, weighing 11.68 grams, was coated with high-surface alumina according to the procedure described in Example I, except that the impregnation was not repeated. A weight gain of 0.62 grams resulted from the alumina coating after treatment at 600° C. for 2 hours.

A coating of hydrous stannic oxide was applied on top of the alumina-coated substrate. For this purpose a solution of 73.8 grams $SnCl_4.5H_2O$ was dissolved in 176.2 grams $H_2O$, and the sample immersed in this solution at room temperature. Thereafter, the sample was freed of excess liquid and plunged into a solution of concentrated ammonium hydroxide. This caused the precipitation of hydrous stannic oxide with some $NH_4Cl$ still remaining in the precipitate. The sample was dried at 80° C. for 1 hour. A weight increase of 0.40 grams due to the hydrous stannic oxide coating was observed.

A catalyst solution was prepared by dissolving 0.1517 grams of $(NH_4)_2PtCl_6$ and 0.1368 grams of $RuCl_3.H_2O$ in 100 c.c. of a solution consisting of 9 parts by weight $H_2O$ and one part concentrated ammonium hydroxide solution at 60°–80° C. for 16 hours.

After pretreating the sample in a mixture of water and concentrated $NH_4OH$ (conc. $NH_4OH:H_2O$ about 1:1 by weight) for 24 hours, it was submersed in 30 c.c. of the above noble metal amine catalyst solution in a tight-fitting container and dried in a vacuum oven at 60° C. over a period of 16 hours. Subsequently, the sample was dried at 120° C for 2 hours, heated in a vacuum to 300° C., fired at 300° C. in a flowing gas mixture consisting of 90% nitrogen and 10% hydrogen by volume for 1 hour, and, finally, cooled to room temperature.

Employing the testing procedures described above for generating the data shown in FIG. 2, this sample converted 50% of the available NO at 490° F. and 80% N0 at 550° F. without producing $NH_3$ as a by-product, and it remained unchanged by an accelerated thermal aging treatment consisting of exposure to 800° C. for 24 hours in air, still giving the same conversion temperatures after this treatment. Most catalyst-coating systems do not exhibit this excellent stability but degrade during heat treatment by 50° to 110° F. to higher conversion temperatures.

While the described platinum-ruthenium catalysts are particularly preferred in carrying out the process of the present invention, mixed platinum-rhodium and mixed platinum-iridium catalysts also provide advantages of particular utility in certain systems. Platinum-rhodium catalysts, which are typical of this group, demonstrate extraordinary resistance to degradation at high temperatures even under oxidizing conditions, and are very active for the oxidation of carbon monoxide and hydrocarbons. The tendency of these catalysts to produce ammonia as a by-product can be reduced by firing the catalytic unit to 800°–900° C. for about 24 hours prior to use, and by keeping catalyst loading below about 0.2% by weight. Preferred catalysts in this group include catalysts consisting essentially, in weight percent, of about 70% platinum and 30% rhodium; these are preferably supported on layered support coatings comprising a base layer of alumina and a surface layer of an oxide selected from the group consisting of zirconia, titania, silica, manganese oxide or tin oxide. It is particularly preferred in this system to employ catalyst loadings comprising about 0.1-0.2% by weight of the oxide coated-support structure. The following examples illustrate the preparation of devices employing platinum-rhodium and platinum-iridium catalysts according to the present invention.

EXAMPLE III

A cordierite ceramic honeycomb support structure was coated with alumina as described in Example II. The uncoated sample weighed 14.33 grams, and increased by 0.86 grams due to the alumina coating.

A layer of hydrous zirconia weighing 0.83 grams was applied on top of the alumina coating by immersion into a 75% solution of zirconium-tetra-n-propoxide in n-propanol at room temperature and subsequent hydrolysis in a steam atmosphere for 30 minutes at 120° C. and 18 psi pressure.

A catalyst solution was prepared by dissolving 0.2124 grams of $(NH_4)_2PtCl_6$ and 0.1012 grams of $RhCl_3.3H_2O$ in 100 c.c. of $H_2O$ at 80°-100° C. for 16 hours. The sample was immersed in 30 cc. of the catalyst solution in a tight-fitting container and the water was removed at 60° C. in a vacuum. After drying at 100° C. for 2 hours, the sample was transferred to a furnace and heated in a vacuum to 300° C. A gas mixture consisting of 90% nitrogen and 10% hydrogen was then introduced at 300° C. and a low flow rate through the sample was maintained for 1 hour. Then the sample was allowed to cool. The heat treatment resulted in the decomposition of the noble metal compounds to the metals. The catalyst loading was 0.028 grams of platinum and 0.012 grams of rhodium.

This sample is useful to demonstrate the effects of heat treatment on the tendency toward $NH_3$-formation during NO reduction shown by platinum-rhodium catalysts. Table I summarizes the results obtained when the sample was tested three successivve times employing the test procedure described above to generate the data shown in FIG. 2. The second and third tests were preceded by heat treatments at 800° C. and 900° C. respectively for 24 hours in each case. The vertical columns denoted TV contain the 20%, 50% and 80% NO conversion temperatures for the test bed condition in which ammonia formation is not measured, while the columns denoted AC show the same temperatures for the test bed condition in which ammonia formation is shown as an increase in the conversion temperature.

TABLE I

| % Conversion of NO | As Prepared | | After 800° C.-24 Hrs. in Air | | After 900° C.-24 Hrs. in Air | |
|---|---|---|---|---|---|---|
| | TV | AC | TV | AC | TV | AC |
| 20 | 350° F. | 380° F. | 435° F. | 465° F. | 410° F. | 430° F. |
| 50 | 415° F. | 875° F. | 520° F. | 600° F. | 490° F. | 495° F. |
| 80 | 500° F. | 1000° F. | 610° F. | 855° F. | 595° F. | 550° F. |

From this data it is apparent that a pretreatment at elevated temperatures in air is highly desirable in order to virtually eliminate $NH_3$ as a by-product of the NO reduction process in platinum-rhodium systems.

EXAMPLE IV

A cordierite ceramic support similar to the support shown in Example I was impregnated with a melt of aluminum triisopropoxide at about 100°-120° C., then hydrolyzed by immersion in a solution consisting of equal weights of $H_2O$ and concentrated $NH_4OH$. After drying at 80° C. for 16 hours, the procedure was repeated once, resulting in a weight increase from about 11.46 grams to 12.67 grams due to a hydrous alumina coating.

The sample was immersed into 30 c.c. of an ammonia-alkaline solution containing 0.036 grams of platinum and 0.004 grams of iridium, prepared by dissolving appropriate amounts of $(NH_4)_2PtCl_6$ and $(NH_4)_2IrCl_6$ in a mixture of concentrated $NH_4OH$ and water (concentrated $NH_4OH:H_2O$ about 1:10 by weight). After 24 hours in the catalyst solution at room temperature the sample was removed and rinsed with distilled water, dried at 80° C. for 2 hours and fired to 300° C. according to the schedule in Example III. Subsequently, the sample was heated to 800° C. for 24 hours in air.

The catalytic activity as expressed in the conversion of NO was relatively good considering the lower percentage of iridium (i.e. about 10% Ir) admixed with the platinum. Employing the testing procedures used to generate the data shown in FIG. 2 above, 50% conversion of NO was found to occur at 735° F. and 80% conversion at 880° F. No indication of $NH_3$ as by-product was observed in the gas stream.

We have also found that the above mixed noble metal catalysts may be modified by substituting palladium for platinum in the mixture. These substitutions may comprise a part of all of the platinum present. Palladium is useful in improving the thermal stability and catalytic efficiency of the system. A mixed noble metal catalyst consisting, in weight percent, of about 25% platinum, 25% palladium and 50% ruthenium, dispersed on a layered alumina-zirconia support coating in an amount comprising about 0.2% by weight of a coated monolithic honeycomb support structure, was slightly more active than a similarly supported 50% Pt-50% Ru catalyst for the conversion of NO, and produced essentially no ammonia during the conversion process. In addition, the catalyst demonstrated essentially no degradation in activity after heating in air at 800° C. for 24 hours, an indication of the excellent thermal stability of this system.

Platinum is not an essential constituent of these mixtures, as is shown by Example V below which illustrates the activity of and selectivity of a platinum-free catalyst produced according to our invention.

EXAMPLE V

A cordierite ceramic support structure weighing 14.57 grams was coated by the methods described in Examples I, II, and III with a base layer of alumina, amounting to 1.06 grams, and a covering layer of titania weighing 0.66 grams.

After treating this sample for 24 hours at room temperature with a mixture composed of equal weights of $H_2O$ and concentrated ammonium hydroxide, it was immersed in an alkaline solution containing 0.028 grams of palladium and 0.012 grams of ruthenium, prepared according to the procedure outlined in Example III. Contacting with catalyst solution, removal of water and firing were then carried out similarly to Example III.

The results shown below in Table II, taken from catalytic tests corresponding to the tests carried out in Example III, indicate that palladium constituted a suitable replacement for platinum in the catalyst systems of the invention.

TABLE II

| % Conversion of NO | As Prepared | | After 800° C.-24 Hrs. in Air | |
| --- | --- | --- | --- | --- |
| | TV | AC | TV | AC |
| 20 | 415° F. | 420° F. | 490° F. | 485° F. |
| 50 | 460° F. | 480° F. | 545° F. | 530° F. |
| 80 | 560° F. | 550° F. | 630° F. | 625° F. |

In using devices of the kind hereinbefore described to treat automobile exhaust gases, it is anticipated that no external control over the temperature of the reaction zone will be required, since the heat of the exhaust will be more than sufficient to initiate the desired catalytic reaction process. Similarly, it is not anticipated that control over the oxygen content in the exhaust atmosphere will be required during operation in the reducing mode. However, as can be seen from FIG. 1 of the drawing, maximum efficiency and selectivity for NO conversion can be obtained in automotive systems if substoichhiometric air-to-fuel ratios can be maintained which will result in an overall reducing gaseous environment. Useful air-to-fuel ratios are expected to range from about 90% of stoichiometric to just below the stoichiometric ratio. In the case of the engine and fuel employed in generating the data shown in FIG. 1, wherein the stoichiometric air-to-fuel ratio was about 14.7-to-1, the best results for NO conversion are obtained while operating the engine at an air-to-fuel ratio above about 13.2 but below about 14.7.

From the description and examples shown above, it is apparent that the mixed noble metal catalyst systems herein disclosed may be advantageously used in processes for removing NO and other pollutants from waste gases which result from combustion processes to provide increased conversion efficiency without the formation of harmful constituents as by-products of the removal process. Our devices and methods therefore constitute useful means for controlling atmospheric pollution due to automotive exhaust and other noxious waste gases.

We claim:

1. A process for treating the exhaust gases from an internal combustion engine to obtain the reduction of the oxides of nitrogen therein while suppressing the formation of ammonia by-products during said reduction which comprises contacting said exhaust gases prior to the introduction of air or neutralizing fuel gases thereto with a catalytic device comprising a monolithic refractory support structure of the honeycomb type supporting on the surface thereof a mixed noble metal catalyst consisting essentially, in weight percent, of 10-70% iridium and the remainder noble metals selected from the group consisting of platinum, palladium, and mixtures thereof, said mixed noble metal catalyst making up about 0.1-0.5% by weight of said support structure, said engine being operated at a substoichiometric air-to-fuel ratio ranging from 90% of stoichiometric up to but not including a stoichiometric ratio to maintain an overall reducing gaseous environment, said exhaust gases being passed through said support structure at a space velocity in the range of about 15,000-200,000 hr.$^{-1}$, and said exhaust gases being at a temperature at least sufficient to initiate the catalytic reduction of the oxides of nitrogen upon contact with said mixed noble metal catalyst.

2. A process according to claim 1 wherein the mixed noble metal catalyst is supported by an oxide support coating on a refractory support structure.

3. A process according to claim 2 wherein the oxide support coating consists essentially of at least one oxide selected from the group consisting of alumina, titania, silica, manganese oxide, tin oxide and mixtures thereof.

* * * * *

UNITED STATES PATENT AND TRADEMARK OFFICE
CERTIFICATE OF CORRECTION

PATENT NO. : 4,076,792
DATED : February 28, 1978
INVENTOR(S) : Gordon F. Foster, Helmuth E. Meissner, Janice L. Stiles It is certified that error appears in the above-identified patent and that said Letters Patent are hereby corrected as shown below:

Column 2, line 56, after "as" insert -- a --.

Column 3, line 9, "process" should be -- processes --.

Column 6, line 68, delete "ruthenium" second occurrence.

Column 8, line 7, after "high-surface" insert -- -area --.

Column 10, line 17, "lower" should be -- low --.

Column 10, line 28, "of" should be -- or --.

Column 10, line 66, "constituted" should be -- constitutes --.

Column 11, line 20, "substoichhiometric" should be -- substoichiometric --.

*Signed and Sealed this*

*Nineteenth* Day of *September 1978*

[SEAL]

Attest:

RUTH C. MASON
*Attesting Officer*

DONALD W. BANNER
*Commissioner of Patents and Trademarks*